United States Patent
Kanamori (10) Patent No.: US 7,626,395 B2
(45) Date of Patent: Dec. 1, 2009

(54) HYBRID VEHICLE TESTING SYSTEM AND METHOD

(75) Inventor: Akihiko Kanamori, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/297,411

(22) PCT Filed: Oct. 5, 2007

(86) PCT No.: PCT/JP2007/070017

§ 371 (c)(1),
(2), (4) Date: Oct. 16, 2008

(87) PCT Pub. No.: WO2008/053687

PCT Pub. Date: May 8, 2008

(65) Prior Publication Data

US 2009/0096463 A1    Apr. 16, 2009

(30) Foreign Application Priority Data

Nov. 3, 2006    (JP) .............................. 2006-299714

(51) Int. Cl.
*H02K 15/00* (2006.01)
*B60W 20/00* (2006.01)

(52) U.S. Cl. .................. 324/503; 324/772; 73/862.193; 903/902

(58) Field of Classification Search ................. 324/503; 73/862.193
See application file for complete search history.

(56) References Cited

U.S. PATENT DOCUMENTS

| | | | | |
|---|---|---|---|---|
| 5,652,526 | A  * | 7/1997  | Sullivan et al. | 324/772 |
| 6,291,987 | B1 * | 9/2001  | Dean et al. | 324/158.1 |
| 6,970,807 | B2 * | 11/2005 | Kito et al. | 702/183 |
| 2002/0002430 | A1 | 1/2002 | Nada | |
| 2004/0084234 | A1 * | 5/2004 | Yatabe et al. | 180/65.2 |
| 2004/0134267 | A1 | 7/2004 | Boesch et al. | |
| 2006/0058932 | A1 * | 3/2006 | Garg et al. | 701/29 |

FOREIGN PATENT DOCUMENTS

| | | |
|---|---|---|
| JP | 10-073517 | 3/1998 |
| JP | 2001-164960 A | 6/2001 |
| JP | 2005-140668 A | 7/2004 |
| JP | 2004-219354 A | 8/2004 |

* cited by examiner

*Primary Examiner*—Timothy J Dole
*Assistant Examiner*—John Zhu
(74) *Attorney, Agent, or Firm*—Kenyon & Kenyon LLP (57) ABSTRACT

In a hybrid vehicle, first, an engine is locked by an engine shaft locking mechanism. A first motor is connected to a first inverter circuit and a second motor is connected to a second inverter circuit and then both the motors are operated, and the output characteristics of each motor are obtained. Further, the first motor is connected to the second inverter circuit and the second motor is connected to the first inverter circuit and then both the motors are operated, and the output characteristics of each motor are obtained. Based on the obtained output characteristics, it is determined whether each of the motors and the inverter circuits is normal or not.

4 Claims, 5 Drawing Sheets

|  |  | TRANSAXLE | |
|---|---|---|---|
|  |  | MG1 | MG2 |
| INVERTER | Cmg1 | A | D |
| | Cmg2 | C | B |

HYBRID VEHICLE TESTING SYSTEM AND METHOD

This is a 371 national phase application of PCT/JP2007/070017 filed 05 Oct. 2007, claiming priority to Japanese Patent Application No. 2006-299714 filed 03 Nov. 2006, the contents of which are incorporated herein by reference.

TECHNICAL FIELD

The present invention relates to a hybrid vehicle testing system and method for testing the performance of a hybrid vehicle. More particularly, the invention relates to a hybrid vehicle testing system and method capable of testing the performances of drive units including a drive source (motor) for a hybrid vehicle and, with respect to a vehicle having poor performance, specifying the cause of the poor performance.

BACKGROUND ART

In recent years, from the viewpoint of lower pollution and the like, attention is paid to a hybrid vehicle using an engine and a motor as power sources and traveling while controlling the engine and the motor. In such a hybrid vehicle, a power transmission unit (transaxle) for outputting power obtained from the motor and the engine to a drive shaft via a transmission is mounted. This technique is disclosed in JP2001-164960A, for example.

A hybrid vehicle is requested to have high-precision torque performance for realizing smooth travel. Techniques for testing the hybrid vehicle are disclosed in, for example, JP2004-219354A and JP2005-140668A. Specifically, JP2004-219354A discloses a technique for testing the performance of a motor and capable of specifying the cause of a failure. JP2005-140668A discloses a technique for testing the performance of a transaxle including two motors and a differential device and capable of specifying the cause of a failure.

However, the aforementioned conventional hybrid vehicle testing techniques have the following problems. Specifically, the testing techniques disclosed in JP2004-219354A and JP2005-140668A relate to tests for a single motor or a single transaxle but not tests to be conducted in a state where the motor or transaxle is combined with an inverter. On the other hand, when the motor is tested in a vehicle state as a final product form, abnormal output characteristics of the motor are detected not only when the motor is defective but also when the inverter is defective. In such cases, according to the conventional testing techniques, it is impossible to distinguish whether the failure is caused by abnormality of the motor itself, breakdown of the inverter that drives the motor, or a combination thereof. Consequently, in the case where a failure is detected in the vehicle state (for example, a failure which occurs in a general test just before shipment or in use), the region of the failure, which is in the motor itself or in a part combined with the inverter, cannot be specified, so that the whole hybrid system has to be replaced.

DISCLOSURE OF THE INVENTION

Problems to be Solved by the Invention

The present invention has been made to solve the above problems and has an object to provide a hybrid vehicle testing system and method capable of testing the performance of a motor itself and, with respect to a motor having poor performance, specifying whether the poor performance is caused in the motor itself or the inverter.

Means for Solving the Problems

The above objects are attained by combinations of the features set forth in independent claim(s), and dependent claims give further advantageous embodiments of the present invention.

Specifically, a first aspect of the present invention provides a hybrid vehicle testing system for performing a test of a hybrid vehicle in which a drive unit including a first motor and a second motor, an inverter unit including a first inverter circuit for the first motor and a second inverter circuit for the second motor, and an engine having an output shaft are mounted as power sources so that power transmission is allowed between the engine, the first motor, and the second motor, wherein the testing system includes a locking mechanism for locking the output shaft of the engine, the testing system is arranged to perform the test by: locking the engine by the locking mechanism; operating the first and second motors in a first mode that the first motor is connected to the first inverter circuit and the second motor is connected to the second inverter circuit to obtain output characteristics of each motor operated in the first mode; operating the first and second motors in a second mode that the first motor is connected to the second inverter circuit and the second motor is connected to the first inverter circuit to obtain output characteristics of each motor operated in the second mode; and determining whether the output characteristics of each motor are normal or not.

Specifically, the hybrid vehicle testing system of the present invention is a system for testing each of the first motor and the second motor which are mounted on the hybrid vehicle, and the first inverter circuit and the second inverter circuit which drive the motors. With this testing system, a test is conducted as below. Firstly, the engine placed in such a manner as to allow power transmission to/from each motor is locked (a locking step). By locking the revolutions of the output shaft of the engine (an input shaft of the drive unit), only the first and second motors are allowed to operate, thereby transmitting the torque of one of the motors to the other with reliability. Then, the first motor is connected to the first inverter circuit (Combination A) and simultaneously the second motor is connected to the second inverter circuit (Combination B). In other words, the drive unit and the inverter unit are placed in a first connection mode, namely, a normal connection mode. In this normal connection mode, the first motor and the second motor are operated and the output characteristics of each motor in that mode are obtained (a normal-connection mode characteristic obtaining step). For instance, while one of the power sources is operated by torque control and the other is operated by number-of-revolutions control, the output characteristics (output torque, the number of revolutions, power consumption, etc.) of the motor to be tested are obtained. Further, the first motor is connected to the second inverter circuit (Combination C) and simultaneously the second motor is connected to the first inverter circuit (Combination D), which is in a second connection mode, namely, an interchanged connection mode. That is, the connecting relations between the inverter circuits and the motors are interchanged from those in the normal connection mode. In the interchanged connection mode, the first motor and the second motor are operated and the output characteristics of each motor are obtained (an interchanged-connection-mode characteristics obtaining step). Thereafter, the output characteristics obtained in each of the four combinations are checked (a failure determination step). Based on combinations of the test results, a defective one can be specified among the first motor, second motor, first inverter circuit, and second inverter circuit. Specifically, in the case where motor output is abnormal, if the output of one motor is abnormal even after the inverter circuits are interchanged to be connected to that motor, it can be determined that the concerned motor is defective. On the other hand, even where the inerter circuits are interchanged, if the outputs of the motors connected to one inverter circuit are abnormal, it can be determined that the concerned inverter is defective. Consequently, the testing system of the present invention allows motors to be tested in combination of the drive unit and the inverter unit, thereby specifying an abnormal or defective part.

In the testing system of the present invention, in a state where the drive unit and the inverter unit to be tested are mounted on a hybrid vehicle, locking and operation of the engine and each motor are automatically controlled and further the motors of the drive unit and the inverter circuits of the inverter unit are interchanged into different connecting combinations, and the output characteristics of each motor are measured. Specifically, without detaching any of the units from the vehicle, the output characteristics of each of the motors mounted on the vehicle are measured and a defective part can be specified. Therefore, the performance of each of the power sources in the hybrid vehicle in a final form (a vehicle state) can be tested in a state where each power source is combined with the other hybrid units not only during manufacture of the vehicle but also at the end of manufacture (an initial state), during use (aging change) and, further, at the time of occurrence of a failure.

Furthermore, it is preferable that the hybrid vehicle testing system of the present invention includes breaking electrical connection between the drive unit and the inverter unit, and applying test voltage to each inverter circuit of the inverter unit to determine whether the inverter is normal or not. To be concrete, the electrical connection between the drive unit and the inverter unit is broken, and each inverter circuit is tested singly before the drive unit and the inverter unit connected thereto are tested in combination. This makes it possible to early detect a failure of the inverter circuit itself.

BEST MODE FOR CARRYING OUT THE INVENTION

A detailed description of a preferred embodiment of the present invention will now be given referring to the accompanying drawings. In the present embodiment, the present invention is applied to a test system for hybrid vehicle mounted with a transaxle including two motors.

Figure 1:
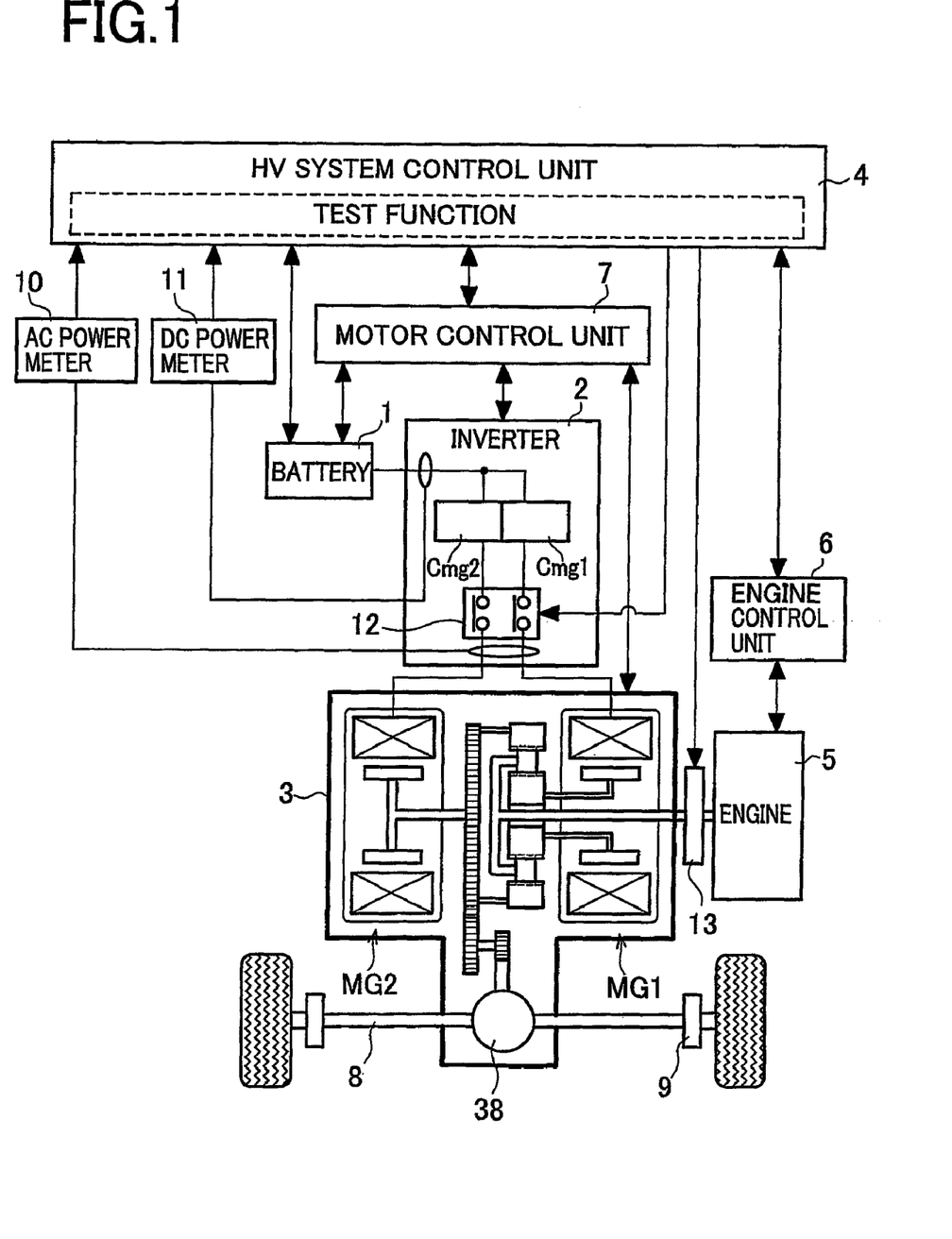
FIG. 1 is a diagram showing a system configuration of a hybrid vehicle in a preferred embodiment.

A hybrid vehicle 100 of the embodiment includes, as shown in FIG. 1, a battery 1, an inverter 2, a transaxle 3, a hybrid system control unit (an HV system control unit) 4, an engine 5, an engine control unit 6, a motor control unit 7, an output shaft 8, a brake 9, an AC power meter 10, a DC power meter 11, an electromagnetic switch 12 for connecting a motor power cable (hereinafter, referred to as a "switch" 12), and an engine shaft locking mechanism 13. The details of a basic system configuration and basic operation of a hybrid vehicle to be tested are described in, for example, JP2001-164960A.

The engine 5 is a well-known internal combustion engine using gasoline as fuel, and undergoes various drive controls such as fuel injection control, ignition control, and intake air volume adjusting control of the engine control unit 6. The engine control unit 6 performs communications with the HV system control unit 4 and controls the operation of the engine 5 according to a control signal from the HV system control unit 4. As necessary, the engine control unit 6 outputs data regarding the operating condition of the engine 5 to the HV system control unit 4.

The transaxle 3 has two motors MG1 and MG2, a power transfer 30, and a differential gear 38, and the motors MG1 and MG2 and the differential gear 38 are placed to be able to transfer power to each other via the power transfer 30. The motors MG1 and MG2 are a known synchronous generator-motor functioning as a generator and a motor. The motors MG1 and MG2 are electrically coupled to the battery 1 via the switch 12 and the inverter 2. The motors MG1 and MG2 are controlled to operate by the motor control unit 7. The motor drive unit 7 can receive signals necessary for controlling the motors MG1 and MG2, for example, a signal from a rotation position sensor (not shown) for detecting the rotation position of a rotor of each of the motors MG1 and MG2. The motor control unit 7 can output a switching control signal to the inverter 2. The motor control unit 7 is arranged to communicate with the HV system control unit 4 and control the motors MG1 and MG2 in accordance with a control signal from the HV system control unit 4. Furthermore, as needed, the motor control unit 7 can output data regarding the operating condition of the motors MG1 and MG2 to the HV system control unit 4.

Figure 2:
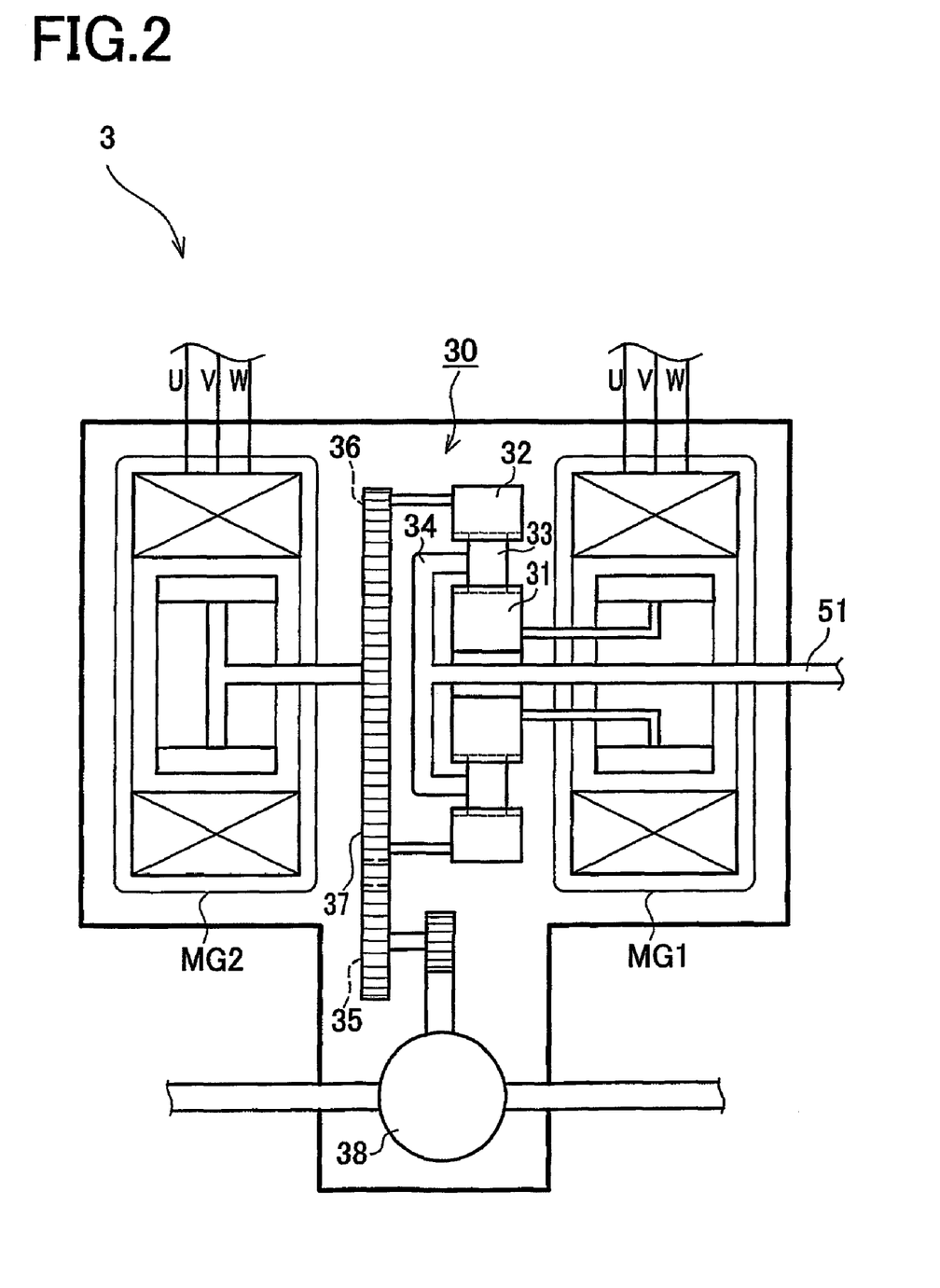
FIG. 2 is a diagram showing a configuration of a power transfer of a transaxle.

The power transfer 30 includes, as shown in FIG. 2, a sun gear 31 as an externally-toothed gear, a ring gear 32 as an internally-toothed gear disposed concentrically with the sun gear 31, a plurality of pinion gears 33 engaging with the sun gear 31 and the ring gear 32, and a carrier 34 holding the pinion gears 33 so that the pinion gears 33 can rotate and revolute. The power transfer 30 is constructed as a planetary gear mechanism that differentially operates using the sun gear 31, the ring gear 32, and the carrier 34 as rotational elements. In the transaxle 3, a crankshaft 51 of the engine 5 is coupled to the carrier 34, the motor MG1 is coupled to the sun gear 31, and the motor MG2 is coupled to the ring gear 32. The ring gear 32 is coupled to a power take-off gear 36 for taking off power. The power take-off gear 36 is connected to a power transmission gear 35 via a chain belt 37. Power is thus transmitted between the power take-off gear 36 and the power transmission gear 35.

The inverter 2 is arranged to convert DC current of the battery 1 into AC current, and supply the resultant AC current as motor current to the motors MG1 and MG2 of the transaxle 3. The inverter 2 further includes an inverter circuit section for the motor MG1 (hereinafter, referred to as "inverter circuit Cmg1") and an inverter circuit section for the motor MG2 (hereinafter, referred to as "inverter circuit Cmg2") which are controlled by the motor control unit 7.

The switch 12 is arranged to electrically connect/disconnect between the inverter 2 and the transaxle 3. Specifically, the switch 12 is turned on or off to permit or open (break) electrical connections between the inverter circuits Cmg1 and Cmg2 and the motors MG1 and MG2. The switch 12 can connect the inverter circuit Cmg1 to any of the motors MG1 and MG2. Similarly, the switch 12 can connect the inverter circuit Cmg2 to any of the motors MG1 and MG2. These connecting combinations or patterns are controlled by the HV system control unit 4.

The HV system control unit 4 is connected to the engine control unit 6, the motor control unit 7, the battery 1, and others to transmit/receive various control signals to/from those units. Further, the HV system control unit 4 can receive measurement data of the DC power meter 11 for measuring DC current and DC voltage between the battery 1 and the inverter 2 and measurement data of the AC power meter 10 for measuring AC current and AC voltage between the inverter 2 and the transaxle 3. The HV system control unit 4 has not only the function of controlling operations of the whole vehicle system but also the testing function of controlling testing operation, performance determination, and the like.

The testing function of the HV system control unit 4 is executed in the vehicle state, for example, when some abnormal operation is detected in the hybrid vehicle 100 in a normal driving condition or when the operation condition of the hybrid vehicle 100 is switched to a stop state after the abnormal operation is detected. Concretely, the operation condition is switched to the stop state, and a test switch or the like for starting a test mode is operated, starting the testing function. Thus, a test of the HV system is automatically executed. After a series of tests is executed, the testing operation is terminated automatically. A test result is output by turn-on of an abnormality lamp, transmission of data to a test diagnosis tool, and the like.

A method of testing the hybrid vehicle 100 with the HV system control unit 4 will be described. The motors MG1 and MG2 of the transaxle 3 are connected to the inverter 2 through motor cables as shown in FIG. 1. When motor current is supplied from the inverter 2 to each motor, each motor generate torque. The motors MG1 and MG2 are electrically connected to the inverter 2 as above. Therefore, if the inverter circuits Cmg1 or Cmg2 are broken or breakdown of motor winding occurs, the current will not be allowed to flow normally, resulting in abnormal output. The test of the present embodiment is conducted by first testing the inverter 2 singly to check whether the inverter 2 is defective, and then connecting the motors MG1 and MG2 to the inverter circuits Cmg1 and Cmg2 to check whether the motors are defective. Further, the test is performed to check whether the defective part is included in the Motors MG1 and MG2 or in the inverter circuits Cmg1 and Cmg2.

Specifically, the state where the motor MG1 is connected to the inverter circuit Cmg1 (Combination A) and the motor MG2 is connected to the inverter circuit Cmg2 (Combination B) is referred to as a "normal connection mode". The state where the motor MG1 is connected to the inverter circuit Cmg2 (Combination C) and the motor MG2 is connected to the inverter circuit Cmg1 (Combination D) is referred to as an "interchanged-connection mode". These combinations are simply shown in FIG. 3. In the test of the present embodiment, the output characteristics of the motors in each combination are obtained and, based on the resultant output characteristics, a defective part is specified among the inverter circuit Cmg1, inverter circuit Cmg2, motor MG1, or MG2.

Figure 4:
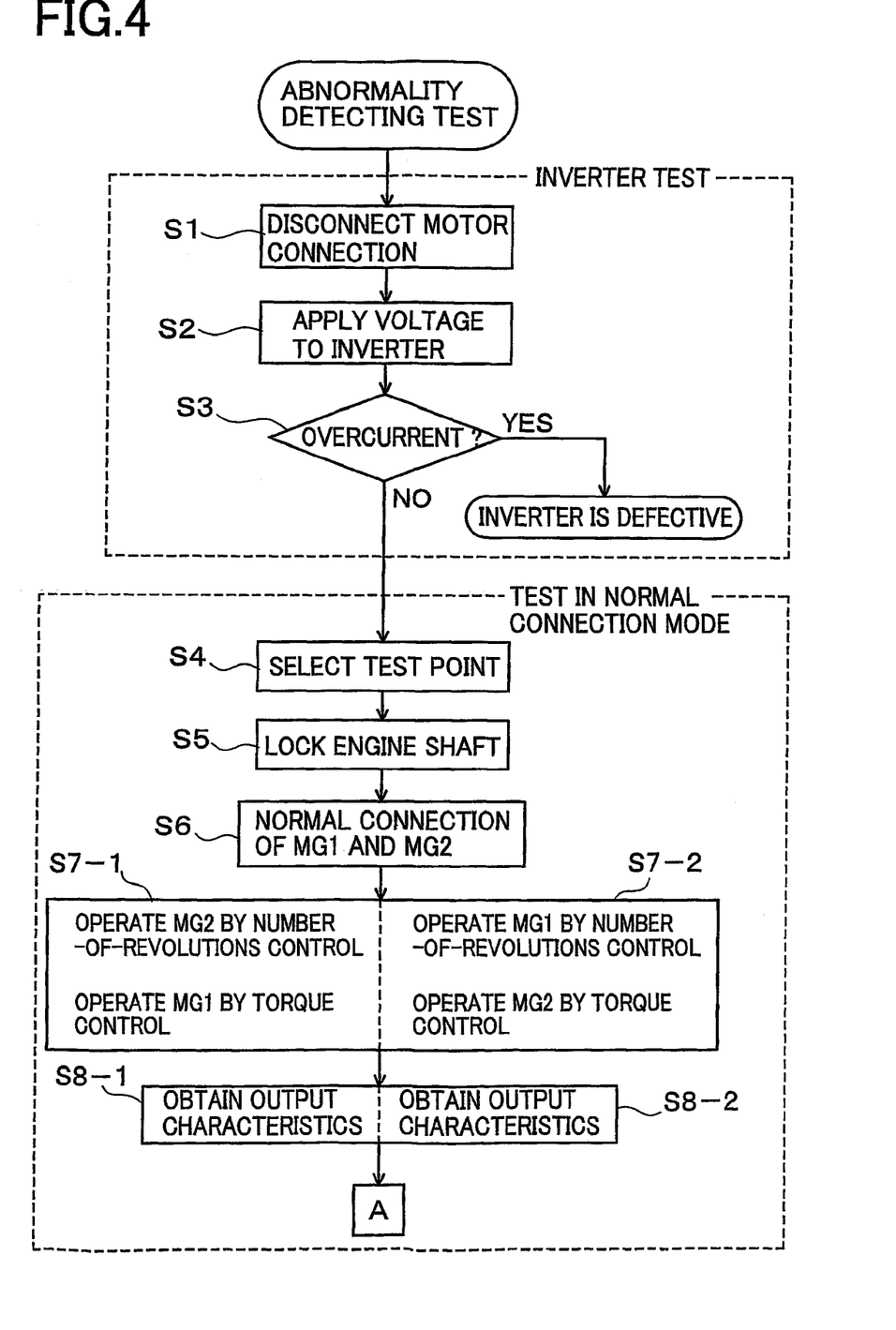
FIG. 4 is a flowchart (Part 1) showing procedures of a hybrid vehicle test in the predetermined embodiment.
Figure 5:
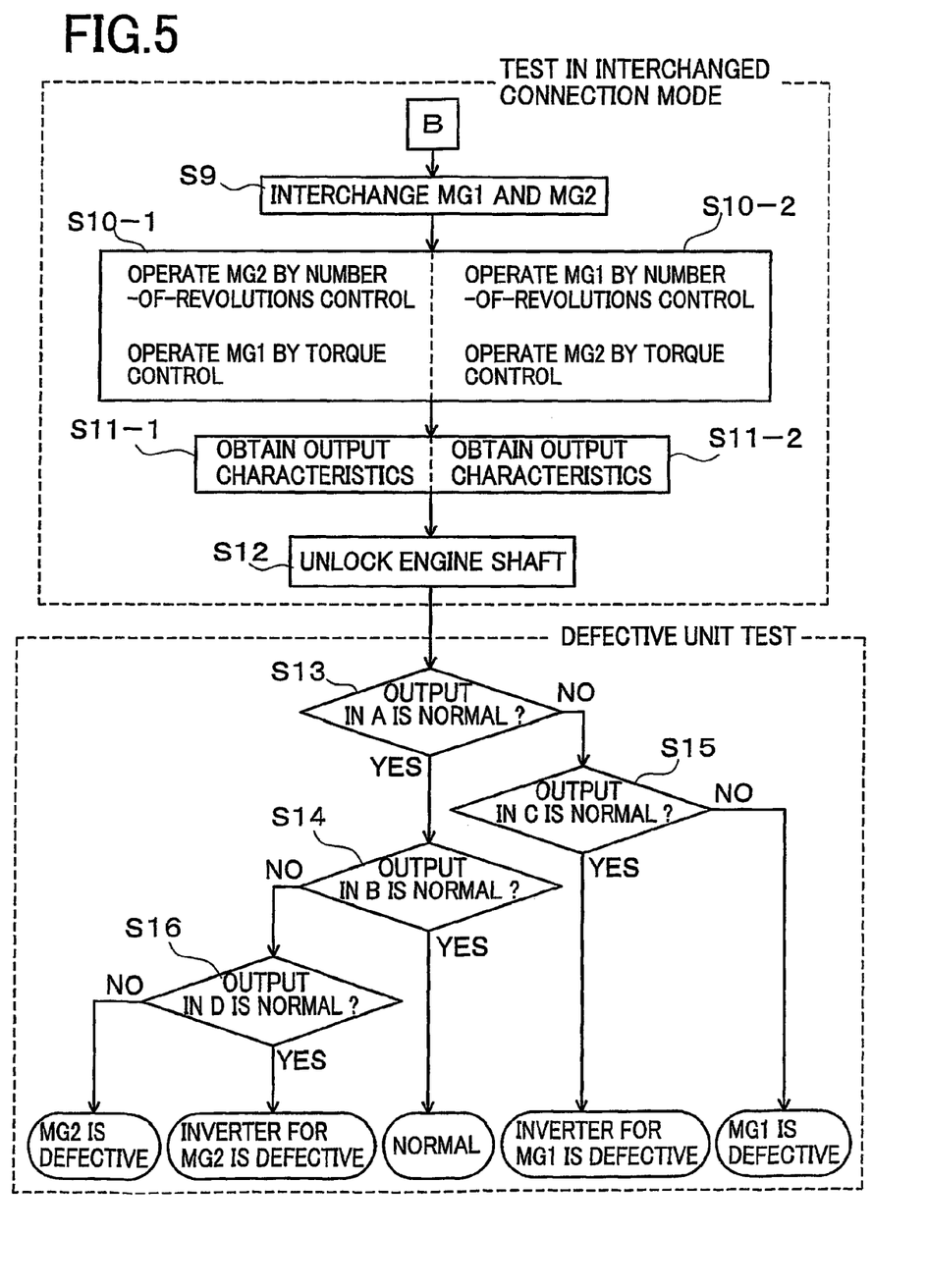
FIG. 5 is a flowchart (Part 2) showing procedures of the hybrid vehicle test in the predetermined embodiment.

A testing procedure for testing the inverter 2 and the motors MG1 and MG2 will be described below, referring to the flowcharts of FIGS. 4 and 5. This test is performed in order by testing the inverter 2 (S1 to S3), testing the motors MG1 and MG2 in the normal connection mode (S4 to S9), testing the motors MG1 and MG2 in the interchanged connection mode (S10 to S13), and determining a defective unit (S14 to S17). Any of the test in the normal connection mode and the test in the interchanged connection mode may be implemented first.

An electrical abnormality detecting test is performed on the inverter 2 alone. In this test, in S1, the switch 12 is turned off to disconnect the electrical connection between the transaxle 3 and the inverter 2, thereby breaking the electrical connection between the inverter circuits Cmg1 and Cmg2 and the motors MG1 and MG2.

In S2, successively, to operate the inverter circuits Cmg1 and Cmg2, voltage is applied to each of the inverter circuits at a voltage level equal to that in the case where the inverter circuits are connected to the motors. In this state, it is monitored whether an overcurrent or overvoltage state occurs in each inverter circuit.

In S3, it is checked if the overcurrent or overvoltage state has occurred in the inverter circuits Cmg1 and Cmg2. This check is made by previously setting thresholds of overcurrent and overvoltage in a previously specified circuit operating pattern and then comparing values obtained by the monitoring with the thresholds.

When the overcurrent or overvoltage state has occurred in at least one of the inverter circuits (S3: YES), it is determined that the inverter 2 is electrically defective, and the present test is terminated. When both the inverter circuits normally operate and no overcurrent or overvoltage state has occurred (S3: NO), the process is advanced to the test of the motors MG1 and MG2.

Next, the test of the motors MG1 and MG2 is conducted in the following procedure. Firstly, in S4, one test point (P_n) is selected from previously set test points. The test point selecting order is preset, and the test points are automatically selected in the preset order. The setting of the selecting order is arbitrary. Alternatively, the selecting order may be arbitrarily set by a tester for each test. Table 1 shows main items which are set at the test point (P_n).

TABLE 1

| TARGET NUMBER OF REVOLUTIONS | | TARGET TORQUE | |
|---|---|---|---|
| Nmg1*: | Target number of revolutions of motor MG1 | Tmg1*: | Target torque of motor MG1 |
| Nmg2*: | Target number of revolutions of motor MG2 | Tmg2*: | Target torque of motor MG2 |

Next, when the test of the motors MG1 and MG2 is to be conducted, the output shaft of the motor 5 is locked (S5). In the test of the motor MG1, for example, the motor MG2 is operated under the number-of-revolutions control and the motor MG1 is operated under the torque control. At this time, the motor MG1 is coupled to the engine 5 and the motor MG2 respectively via the pinion gear 33. Consequently, to output the torque of the motor MG1 to the motor MG2, if the output shaft of the engine 5 is not locked by some means, torque will be transmitted to the output shaft of the engine 5, thereby causing the output shaft of the engine 5 to run idle, so that accurate torque cannot be measured. Therefore, in the test of the motors MG1 and MG2, the output shaft of the engine 5 has to be locked by the engine shaft locking mechanism 13.

As the engine shaft locking mechanism 13, any mechanism may be used as long as it can lock the shaft coupling the engine 5 and the transaxle 3. For example, an electromagnetic brake structure or a mechanical locking method such as a parking brake mechanism can be adopted.

Figure 3:
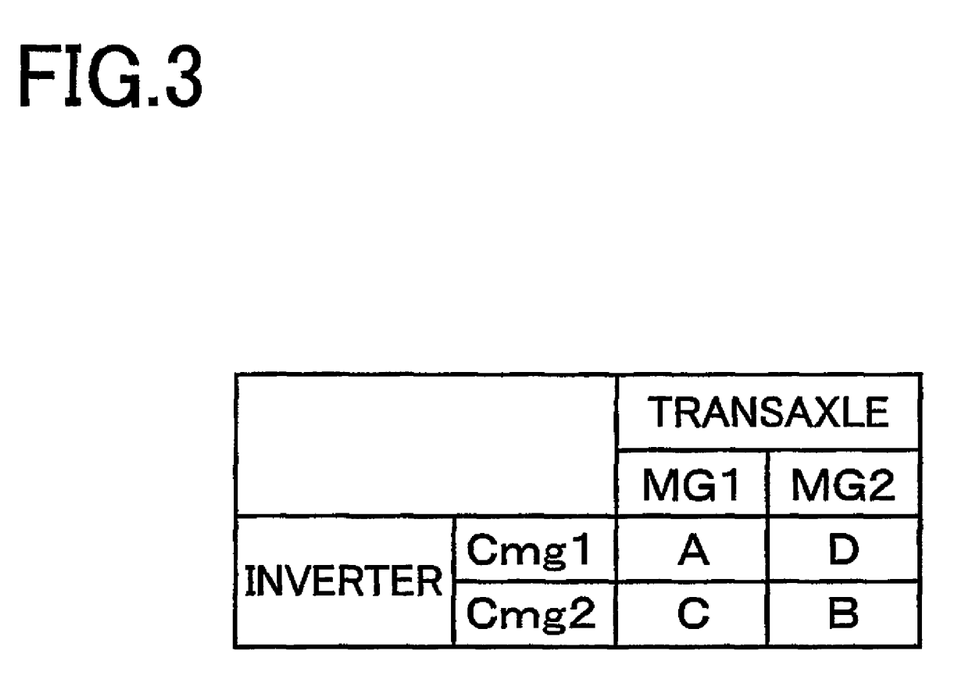
FIG. 3 is a table showing combinations in a test in the present embodiment.

Subsequently, in S6, the inverter 2 is coupled to the motors MG1 and MG2 in the normal connection mode. To be concrete, the motor MG1 is connected to the inverter circuit Cmg1 (Combination A) and the motor MG2 is connected to the inverter circuit Cmg2 (Combination B) as shown in FIG. 3.

The motors MG1 and MG2 are operated based on parameters at the selected test point (P_n) to obtain respective output characteristics. For obtaining the output characteristics, the operation for testing the output characteristics of the motor MG1 and the operation for testing the output characteristics of the motor MG2 are performed. Any of these two operations may be conducted first.

As the operation for obtaining torque of the motor MG1 whose output characteristics are to be checked, the number-of-revolutions control of the motor MG2 and the torque control of the motor MG1 are executed (S7-1). Specifically, the motor MG1 is operated by the torque control so that the torque becomes target torque Tmg1*. The motor MG2 is operated by the number-of-revolutions control so that the number of revolutions of the motor MG1 becomes a "target number of revolutions" Nmg1*. Concretely, torque for controlling the number of revolutions of the motor MG2 is calculated by the following arithmetic expression (1) to accelerate or decelerate the motor MG2, thereby adjusting the "number of revolutions" Nmg1 of the motor MG1.

$$Tmg2=(Nmg2^*-Nmg2)\times Kp+(Nmg2^*-Nmg2)\times Ki \qquad (1)$$

where Tmg2 denotes control torque of the motor MG2, Nmg2* denotes the target number of revolutions of the motor MG2, Nmg2 denotes the actual number of revolutions of the motor MG2, Kp denotes proportional control gain, Ki indicates integral control gain.

When the output stable state is obtained after an operation transition period, the output torque Tmg2 of the motor MG2 and the motor torque Tmg1 of the motor MG1 which is load torque to the motor MG2 become equal to each other. The torque control value in this state is the test torque of the motor MG1.

Successively, in a state where the torque is output, the output characteristics data is obtained (S8-1). In the present embodiment, control data of the motor MG2 is obtained. Concretely, the control torque Tmg2 of the motor MG2 used in the process of S7-1 is obtained and recorded in the HV system control unit 4. As the output characteristics data of the motor MG1, the number of revolutions Nmg1 of the motor MG1 or power supplied to the motor MG1 may be used.

On the other hand, as the operation for obtaining torque of the motor MG2 whose output characteristics are to be checked, the number-of-revolutions control of the motor MG1 and the torque control of the motor MG2 are executed (S7-2). Specifically, the motor MG2 is operated by the torque control so that the torque becomes target torque Tmg2*. The motor MG1 is operated by the number-of-revolutions control so that the number of revolutions of the motor MG2 becomes target number of revolutions Nmg2*. Concretely, torque for controlling the number of revolutions of the motor MG1 is calculated by the following arithmetic expression (2) to accelerate or decelerate the motor MG1, thereby adjusting the "number of revolutions" Nmg2 of the motor MG2.

$$Tmg1=(Nmg1^*-Nmg1)\times Kp+(Nmg1^*-Nmg1)\times Ki \qquad (2)$$

where Tmg1 denotes control torque of the motor MG1, Nmg1* denotes the target number of revolutions of the motor MG1, Nmg1 denotes the actual number of revolutions of the motor MG1, Kp denotes proportional control gain, Ki indicates integral control gain.

When the output stable state is obtained after an operation transition period, the output torque Tmg1 of the motor MG1 and the motor torque Tmg2 of the motor MG2 which is load torque to the motor MG1 become equal to each other. The torque control value in this state is the test torque of the motor MG2.

Successively, in a state where the torque is output, the output characteristics data is obtained (S8-2). In the present embodiment, control data of the motor MG1 is obtained. Concretely, the control torque Tmg1 of the motor MG1 used in the process of S7-2 is obtained and recorded in the HV system control unit 4. As the output characteristics data of the motor MG2, the number of revolutions Nmg2 of the motor MG2 or power supplied to the motor MG2 may be used.

Next, the inverter 2 is coupled to the motors MG1 and MG2 in the interchanged connection mode (S9). To be concrete, the motor MG1 is connected to the inverter circuit Cmg2 (Combination C) and the motor MG2 is connected to the inverter circuit Cmg1 (Combination D) as shown in FIG. 3.

The motors MG1 and MG2 are operated based on parameters at the selected test point (P_n) to obtain respective output characteristics. For obtaining the output characteristics, the aforementioned two operations (one is for obtaining the output characteristics of motor MG1 and the other is for obtaining the output characteristics of the motor MG2) are performed. Any of these two operations may be performed first.

Specifically, as the operation for obtaining the output characteristics of the motor MG1, the number-of-revolutions control of the motor MG2 and the torque control of the motor MG1 are executed (S10-1). In a state where the torque is output, the output characteristics data is obtained (S11-1). In the present embodiment, control data of the motor MG2 is obtained. Concretely, the control toque Tmg2 of the motor MG2 used in the process of S10-1 is obtained and recorded in the HV system control unit 4. As the output characteristics data of the motor MG2, the number-of-revolutions control of the motor MG1 and the torque control of the motor MG2 are executed (S10-2). In a state where the torque is output, the output characteristics data is obtained (S11-2). In the present embodiment, control data of the motor MG1 is obtained. Concretely, the control toque Tmg1 of the motor MG1 used in the process of S10-2 is obtained and recorded in the HV system control unit 4.

After completion of the operations for testing the motors MG1 and MG2, the engine shaft locking mechanism 13 is unlocked (S12). Thus, the test of the motors MG1 and MG2 is terminated and the process is advanced to a determination step of detecting a defective unit.

Based on the output characteristics data detected by the operations of the combinations of the inverter circuits Cmg1 and Cmg2 and the motors MG1 and MG2, it is determined which unit is defective. Firstly, for determining whether the output characteristics data in the combination A is normal, the output torque Tmg2 obtained in the process of S8-1 is checked in S13. Specifically, it is determined whether the output torque Tmg2 lies in a range between an upper limit TmgAU and a lower limit TmgAL which are previously set in association with the selected test point (P_n).

If the output characteristics data in the combination A is in a normal range (S13: YES), in S14, the output torque Tmg1 obtained in the process of S8-2 is checked to determine whether the output characteristics data in the combination B is normal. Concretely, it is determined whether the output torque Tmg1 lies in a range between an upper limit TmgBU and a lower limit TmgBL which are set in advance in association with the selected test point (P_n).

If the output characteristics data in the combination B is in a normal range (S14: YES), it is determined that both the motors MG1 and MG2 of the transaxle 3 are normal. In other words, no unit is judged to be defective and hence all of the inverter circuit Cmg1 and Cmg2 and the motors MG1 and MG2 are judged to be normal.

If the output characteristics data in the combination A lies outside the normal range (S13: NO), on the other hand, the output torque Tmg2 obtained in the process of S11-1 is checked to determine whether the output characteristics data in the combination C is normal (S15). Concretely, it is determined whether the output torque Tmg2 lies in a range between an upper limit TmgCU and a lower limit TmgCL which are previously set in association with the parameters for the selected test point (P_n).

If the output characteristics data in the combination C is in the normal range (S15: YES), indicating that the interchange of the inverter circuit Cmg1 and the inverter circuit Cmg2 results in different determinations, the inverter circuit Cmg1 of the inverter 2 is judged to be defective. If the output characteristics data in the combination C lies outside the normal range (S15: NO), to the contrary, indicating that the output characteristics data is abnormal even after the interchange of the inverter circuits Cmg1 and Cmg2 to be connected to the motor MG1, the motor MG1 is judged to be defective.

If the output characteristics data in the combination B lies outside the normal range (S14: NO), the output torque Tmg1 obtained in the process of S11-2 is then checked to determine whether the output characteristics data in the combination D is normal (S16). Concretely, it is determined whether the output torque Tmg1 lies in a range between an upper limit TmgDU and a lower limit TngDL which are set in advance in association with the parameters for the selected test point (P_n).

If the output characteristics data in the combination D lies within the normal range (S16: YES), indicating that the interchange of the inverter circuit Cmg1 and the inverter circuit Cmg2 results in different determinations, the inverter circuit Cmg2 of the inverter 2 is judged to be defective. If the output characteristics data in the combination D lies outside the normal range (S16: NO), to the contrary, indicating that the output characteristics data is abnormal even after the interchange of the inverter circuit Cmg1 and the Cmg2, the motor MG2 is judged to be defective.

As explained above in detail, the testing system of the present embodiment is performed in such a manner that the transaxle 3 is connected to the inverter 2 in some combinations of the motors MG1 and MG2 with the inverter circuit Cmg1 and Cmg2, the motors MG1 and MG2 are operated in each combination, and the output characteristics of each motor is measured. Then, the connection of the motors MG1 and MG2 to the inverter circuits Cmg1 and Cmg2 is switched between the normal connection mode and the interchanged connection mode. The test is thus conducted on each of four patterns (combinations A, B, C, and D) of combining the motors and the inverter circuits. It is therefore automatically determined whether the output characteristics measured in each combination lie in a target range. Based on combinations of the test results, which pattern includes a failure can be checked and accordingly a defective one can be specified among the motors and the inverters. Specifically, in the case where the motor output is abnormal, if the output of one motor is abnormal even after the inverter circuits are interchanged to that motor, it can be determined that the concerned motor is defective. On the other hand, even where the inverter circuits are interchanged, if the outputs of the motors connected to one inverter circuit are abnormal, it can be determined that the concerned inverter is defective. Consequently, the hybrid vehicle testing system and method of the present embodiment can test the performance of the motor itself and, with respect to a motor having poor performance, specify whether the poor performance is caused by the motor itself or the inverter.

The test of the present embodiment is executed in such a manner as to break the electrical connection between the transaxle 3 and the inverter 2 and test only the inverter 2 prior to the test of the motors MG1 and MG2. This allows early detection of abnormality of the inverter 2 itself.

According to the test of the present embodiment, the hybrid vehicle 100 is allowed to be tested in a final product form (in a vehicle state). Therefore, the test can be carried out not only during manufacture of the vehicle but also at the end of manufacture (an initial state), during use (aging change) and, further, at the time of occurrence of a failure.

The above embodiment is merely an example without restricting the present invention. The present invention may therefore be embodied in other specific forms without departing from the essential characteristics thereof. For instance, the hybrid vehicle as a test subject does not always have to be in a final product form. Specifically, the hybrid vehicle has only to be configured such that the engine 5, the motors MG1 and MG2 of the transaxle 3 are placed to allow power transmission to each other and each power source is allowed to be controlled to operate and locked.

The invention claimed is:

1. A hybrid vehicle testing system for performing a test of a hybrid vehicle in which a drive unit including a first motor and a second motor, an inverter unit including a first inverter circuit for the first motor and a second inverter circuit for the second motor, and an engine having an output shaft are mounted as power sources so that power transmission is allowed between the engine, the first motor, and the second motor,
wherein the testing system includes a locking mechanism for locking the output shaft of the engine,
the testing system is arranged to perform the test by:
locking the engine by the locking mechanism;
operating the first and second motors in a first mode that the first motor is connected to the first inverter circuit and the second motor is connected to the second inverter circuit to obtain output characteristics of each motor operated in the first mode;
operating the first and second motors in a second mode that the first motor is connected to the second inverter circuit and the second motor is connected to the first inverter circuit to obtain output characteristics of each motor operated in the second mode; and
determining whether the output characteristics of each motor are normal or not.

2. The hybrid vehicle testing system according to claim 1, wherein the testing system is arranged to break electrical connection between the drive unit and the inverter unit, and determine whether each inverter circuit of the inverter unit is normal or not by applying test voltage to each of the inverter circuits of the inverter unit.

3. A hybrid vehicle testing method for testing a hybrid vehicle in which a drive unit including a first motor and a second motor, an inverter unit including a first inverter circuit for the first motor and a second inverter circuit for the second motor, and an engine having an output shaft are mounted as power sources so that power transmission is allowed between the engine, the first motor, and the second motor,
wherein the testing method comprises the steps of:
locking the output shaft of the engine;
operating the first and second motors in a normal connection mode that the first motor is connected to the first inverter circuit and the second motor is connected to the second inverter circuit to obtain output characteristics of each motor operated in the normal connection mode;
operating the first and second motors in an interchanged connection mode that the first motor is connected to the second inverter circuit and the second motor is connected to the first inverter circuit to obtain output characteristics of each motor operated in the interchanged connection mode; and
determining whether the output characteristics obtained in each of the normal connection mode and the interchanged connection mode are normal or not.

4. The hybrid vehicle testing method according to claim 3 further including the step of breaking electrical connection between the drive unit and the inverter unit, and determining whether each inverter circuit of the inverter unit is normal or not by applying test voltage to each of the inverter circuits of the inverter unit.

* * * * *